United States Patent
Hara et al.

(10) Patent No.: US 9,184,446 B2
(45) Date of Patent: Nov. 10, 2015

(54) NON-AQUEOUS ELECTROLYTE LITHIUM ION SECONDARY BATTERY

(75) Inventors: Tomitaro Hara, Okazaki (JP); Akira Tsujiko, Aichi-ken (JP); Sachie Yuasa, Okazaki (JP); Takahito Imamine, Nisshin (JP); Yuichi Itou, Toyota (JP); Hiroshi Sawada, Seto (JP); Chikaaki Okuda, Nagoya (JP); Osamu Hiruta, Nagoya (JP); Mamoru Mizutani, Owariasahi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 699 days.

(21) Appl. No.: 13/501,106

(22) PCT Filed: Oct. 13, 2009

(86) PCT No.: PCT/JP2009/067739
§ 371 (c)(1),
(2), (4) Date: Nov. 2, 2012

(87) PCT Pub. No.: WO2011/045848
PCT Pub. Date: Apr. 21, 2011

(65) Prior Publication Data
US 2013/0045417 A1    Feb. 21, 2013

(51) Int. Cl.
*H01M 4/58* (2010.01)
*H01M 4/131* (2010.01)
*H01M 4/62* (2006.01)
*H01M 10/0525* (2010.01)
*H01M 4/02* (2006.01)

(52) U.S. Cl.
CPC ............ *H01M 4/5825* (2013.01); *H01M 4/131* (2013.01); *H01M 4/62* (2013.01); *H01M 4/622* (2013.01); *H01M 10/0525* (2013.01); *H01M 2004/028* (2013.01); *H01M 2220/20* (2013.01); *Y02E 60/122* (2013.01); *Y02T 10/7011* (2013.01)

(58) Field of Classification Search
CPC .............. H01M 4/5825; H01M 4/131; H01M 10/0525; H01M 2004/028; H01M 2220/20; Y02E 60/122; Y02E 10/7011
See application file for complete search history.

(56) References Cited

U.S. PATENT DOCUMENTS

| 2008/0160407 A1 | 7/2008 | Ishii et al. |
| 2008/0193845 A1 | 8/2008 | Muraoka et al. |
| 2009/0023073 A1 | 1/2009 | Okada et al. |

FOREIGN PATENT DOCUMENTS

| CA | 2 251 709 | 10/1997 |
| CA | 2 543 784 | 10/1997 |
| CA | 2 729 900 | 1/2010 |
| JP | 2005-225734 | 8/2005 |
| JP | 2008-41502 | 2/2008 |
| JP | 2008-166207 | 7/2008 |
| JP | 2008-198506 | 8/2008 |
| JP | 2008-288112 | 11/2008 |
| JP | 2008-311067 | 12/2008 |
| JP | 2009-43715 | 2/2009 |

OTHER PUBLICATIONS

International Search Report in International Application No. PCT/JP2009/067739; Mailing Date: Jan. 12, 2010.

*Primary Examiner* — Laura Weiner
(74) *Attorney, Agent, or Firm* — Finnegan, Henderson, Farabow, Gerrett & Dunner, LLP

(57) ABSTRACT

A lithium ion secondary battery provided by the present invention has a positive electrode having a current collector and a positive electrode composite layer provided on the current collector. The current collector contains a metal element A as a main component thereof. The positive electrode composite layer contains a two-phase compound containing lithium as a positive electrode active material. The positive electrode composite layer also contains as an additive a compound having a metal element B, in a composition thereof, that has a higher ionization tendency than the metal element A.

4 Claims, 4 Drawing Sheets

NON-AQUEOUS ELECTROLYTE LITHIUM ION SECONDARY BATTERY

CROSS-REFERENCE TO RELATED APPLICATIONS

This application is a national phase application of International Application No. PCT/JP2009/067739, filed Oct. 13, 2009, the contents of which are incorporated herein by reference.

TECHNICAL FIELD

The present invention relates to a lithium ion secondary battery that uses a two-phase positive electrode active material.

BACKGROUND ART

Lithium ion secondary batteries are provided with positive and negative electrodes capable of reversibly storing and releasing lithium ions and an electrolyte interposed between both electrodes, and these batteries are charged and discharged by the migration of lithium ions in the electrolyte between both of the electrodes. These batteries are proliferating as power supplies of various types of portable devices due to their light weight and high energy density. In addition, since they are also expected to be used in fields requiring large capacity power supplies in the manner of hybrid vehicles and electric vehicles, there is a need for further improvement of the safety and endurance thereof. Examples of technical documents relating to various improvements in the performance of lithium ion secondary batteries include Patent Literatures 1 and 2.

CITATION LIST

Patent Literature

Patent Literature 1: Japanese Patent Application Laid-open No. 2008-198506
Patent Literature 2: Japanese Patent Application Laid-open No. 2005-225734

However, olivine compounds, lisicon compounds (also referred to as nasicon compounds) and other two-phase compounds (such as $LiFePO_4$ or $Li_3Fe_2(PO_4)_3$) are attracting attention as positive electrode active materials that contribute to improvement of battery safety. Since elementary oxygen is present in these compounds in a state of being strongly covalently bonded within a polyanion, there is less likelihood of generation of oxygen gas in comparison with lithium transition metal complex oxides (e.g., lithium cobalt oxides) commonly used as conventional positive electrode active materials, and these compounds are expected to be used as positive electrode materials having superior safety. Consequently, there is a need for the development of a lithium ion secondary battery that uses a two-phase compound for the positive electrode active material (to also be simply referred to as a two-phase lithium ion secondary battery) that offers even higher performance. For example, it would be beneficial to provide a two-phase lithium ion secondary battery that inhibits reductions in performance (such as charge/discharge cycle characteristics) resulting from endurance testing.

SUMMARY OF INVENTION

An object of the present invention is to provide a lithium ion secondary battery that uses a two-phase compound for the positive electrode active material while having superior endurance.

The inventors of the present invention focused on the fact that, when endurance testing for use with vehicles is carried out on a two-phase lithium ion secondary battery, there are cases in which performance (such as charge/discharge cycle characteristics) deteriorates considerably in comparison with endurance testing for use with small devices. As a result of carefully examining two-phase lithium ion secondary batteries that underwent deterioration of performance as a result of carrying out endurance testing for vehicles, the inventors of the present invention found that corrosion is observed on the positive electrode current collector. The inventors of the present invention also found that corrosion of the positive electrode current collector is inhibited by adding a prescribed additive to the positive electrode composite used to form the positive electrode, thereby leading to completion of the present invention.

According to the present invention, a lithium ion secondary battery is provided that is provided with a positive electrode having a current collector and a positive electrode composite layer provided on the current collector. The current collector contains a metal element A as a main component thereof. The positive electrode composite layer contains a two-phase compound containing lithium as a positive electrode active material, and further contains as an additive a compound having a metal element B in the composition thereof that has a higher ionization tendency than the metal element A. Here, the two-phase compound refers to a compound capable of reversibly storing and releasing lithium ions and in which a phase that contains lithium ions and a phase that does not contain lithium ions are able to be simultaneously and stably present within the same crystal structure.

As a result of using this additive in combination with a two-phase compound serving as the positive electrode active material in this manner, corrosion of the current collector and accompanying increases in internal resistance can be inhibited. Thus, according to this configuration, a lithium ion secondary battery can be provided that has endurance enabling it to be compatible with vehicle applications and other applications associated with harsh usage conditions.

In a preferable aspect of the lithium ion secondary battery disclosed herein, the two phase compound is an olivine compound (compound having an olivine crystal structure) represented by the general formula: $Li_xFe_{1-y}M_yZO_4$. In the formula, M represents at least one type of element selected from Mn, Mg, Ni, Co, Cu, Zn, Ge, Cr, V, Nb, Mo, Ti and Ga. Z represents P or Si. x satisfies the relationship of $0.05 \leq x \leq 1.2$. In addition, y satisfies the relationship of $0 < y \leq 0.5$. According to this configuration, a lithium ion secondary battery can be realized that has more superior endurance.

In another preferable aspect, the metal element B is any element selected from Ca, Na, K, Be, Ti, Mg, La, Sr, Ba, Rb and Cs. These metal elements have particularly high ionization tendencies even among metal elements having higher ionization tendencies than typical current collector constituent metals (such as Al), and are able to more effectively inhibit corrosion of the current collector and accompanying increases in internal resistance.

In another preferable aspect, the additive is at least one type of salt selected from fluoride salts, phosphate salts and oxide salts of the metal element B. Corrosion of the current collector and accompanying increases in internal resistance can be more effectively inhibited by these salts.

In another preferable aspect, the additive is a salt that contains the metal element B as a divalent cation, and the positive electrode composite layer contains 0.5 mmol to 8 mmol of the salt per 100 g of the positive electrode active material as the number of moles of the cation $B^{2+}$. As a result, corrosion of the current collector and accompanying increases in internal resistance can be more effectively inhibited.

In another preferable aspect, the additive is a salt that contains the metal element B as a monovalent cation, and the positive electrode composite layer contains 1 mmol to 8 mmol of the salt per 100 g of the positive electrode active material as the number of moles of the cation $B^+$. As a result, corrosion of the current collector and accompanying increases in internal resistance can be more effectively inhibited.

In addition, the lithium ion secondary battery disclosed herein is preferable for use as a vehicle battery since corrosion of the current collector and accompanying increases in internal resistance are inhibited by using the above-mentioned additive in combination with the above-mentioned two-phase compound, thereby enabling the battery to demonstrate superior endurance compatible with charge/discharge cycling under harsh conditions (such as rapid charging and discharging). Thus, according to the present invention, as another aspect, a vehicle is provided that is provided with the lithium ion secondary battery disclosed herein.

DESCRIPTION OF EMBODIMENTS

The following provides an explanation of preferred embodiments of the present invention. Furthermore, matters required for carrying out the present invention other than matters specifically mentioned in the present specification can be understood to be design matters for a person with ordinary skill in the art based on the prior art in the relevant field. The present invention can be carried out based on the contents disclosed in the present specification and common general technical knowledge in the relevant field.

The technology disclosed herein can be applied to a lithium ion secondary battery provided with a positive electrode having a positive electrode composite layer containing as a positive electrode active material a two-phase compound capable of reversibly storing and releasing lithium on a metal current collector. The external form of this secondary battery can be suitably modified corresponding to the application, and although there are no particular limitations thereon, can have an external form having, for example, a rectangular, flat or cylindrical shape. In addition, there are no particular limitations on the shape of the electrode body that contains the positive electrode, and can vary corresponding to the shape of the secondary battery and the like. For example, an electrode body can be preferably employed that is obtained by winding a sheet-like positive electrode and sheet-like negative electrode together with a sheet-like separator.

Figure 1:
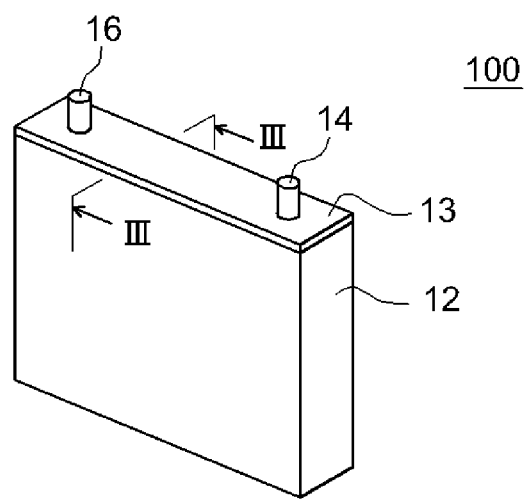
FIG. 1 is a schematic perspective view showing a battery according to one embodiment.
Figure 2:
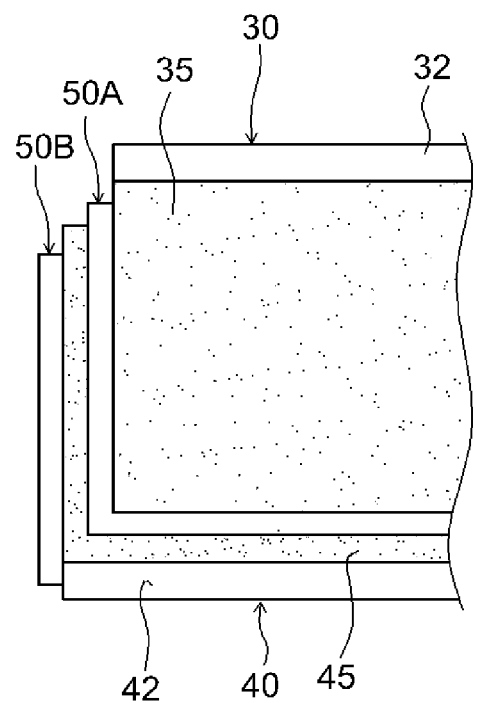
FIG. 2 is a schematic overhead view showing positive and negative electrodes and a separator that compose a battery according to one embodiment.
Figure 3:
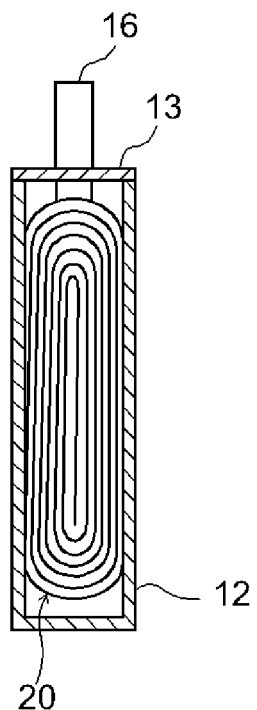
FIG. 3 is a cross-sectional view taken along line III-III of FIG. 1.

Although the following provides a more detailed explanation of one embodiment of the lithium ion secondary battery provided with this wound electrode body of the present invention with reference to the schematic diagrams shown in FIGS. 1 to 3, the intended application of the present invention is not limited to this battery. As shown in the drawings, a lithium ion secondary battery 100 according to the present embodiment is provided with a metal case 12 (although resin or a laminate film is also used preferably). A wound electrode body 20, constructed by laminating a long-length positive electrode sheet 30, a separator 50A, a negative electrode sheet 40 and a separator 50B in that order and then winding into a flat shape, is housed in the case 12.

The positive electrode sheet 30 can be produced by, for example, coating and drying a positive electrode composite on at least one side (and preferably both sides) of a positive electrode current collector 32 to form a positive electrode composite layer 35. A paste-like or slurry-like composition in which a positive electrode active material is dispersed in a suitable solvent together with an electrically conductive material or binder and the like as necessary can be used for the positive electrode composite.

An electrically conductive member composed of a metal material having favorable electrical conductivity and containing the metal element A as a main component thereof is used for the positive electrode current collector 32. An electrically conductive member substantially composed of only the metal element A is typically used. Examples of the metal element A include Al and Au. There are no particular limitations on the shape of the positive electrode current collector since it can be varied corresponding to the shape of the lithium ion secondary battery and the like, and can have various shapes such as that of a rod, plate, sheet, foil or mesh. A sheet-like positive electrode current collector can be preferably employed in the present embodiment.

A two-phase compound capable of reversibly storing and releasing lithium is used for the positive electrode active material. For example, the two-phase compound can contain one type or two or more types of compounds selected from olivine compounds and lisicon compounds. An olivine compound represented by the general formula: $Li_xFe_{1-y}M_yZO_4$ is used particularly preferably. Specific examples of this olivine compound include $LiFePO_4$, $Li_2FeSiO_4$, $LiFe_{0.5}Mn_{0.5}PO_4$, $LiCo_{0.5}Fe_{0.5}PO_4$ and $LiNi_{0.5}Fe_{0.5}PO_4$. A particularly preferable example is $LiFePO_4$. In addition, examples of lisicon compounds include $Li_3Fe_2(PO_4)_3$ and $Li_2ZnGeO_4$.

Compounds produced or provided using conventionally known methods can be used without modification for these two-phase compounds. Although there are no particular limitations on the shape thereof, in the present embodiment (wound electrode body), they are preferably prepared in the form of a powder having a mean particle diameter of about 0.05 μm to 1 μm, for example.

In the lithium ion secondary battery disclosed herein, the positive electrode composite layer further contains an additive capable of inhibiting corrosion of the current collector. Thus, in addition to this component, the positive electrode composite further contains as an additive a compound having a metal element B having a higher ionization tendency than the metal element A in the composition thereof. As a result, the lithium ion secondary battery disclosed herein is able to inhibit corrosion of the current collector as well as inhibit increases in internal resistance caused by corrosion of the current collector.

Preferable specific examples of the metal element B include Ca, K, Na, Be, Ti, Mg, La, Sr, Ba, Rb and Cs. These metal elements have particularly high ionization tendencies even among metals having higher ionization tendencies than the main component of ordinary current collector metal materials (such as Al or Au, and typically Al), thereby enabling them to more effectively inhibit corrosion of the current collector. A salt containing the metal element B as a cation can typically be used for the additive.

The anion (counter ion of the above-mentioned cation) contained in the salt can be suitably selected within a range that enables effects to be demonstrated by the present invention. Examples of anions include fluoride ions, phosphate ions, oxide ions and hydroxide ions. Namely, a fluoride salt, phosphate salt or oxide salt and the like of the metal element B can be used for the additive. In addition, a hydroxide salt may also be used that is able to change to an oxide salt in the firing stage. Particularly preferable examples of the additive include $CaF_2$, $Ca_3(PO_4)_2$, $Na_3PO_4$ and $K_3PO_4$.

The amount of the additive used can be suitably set in consideration of the configuration (such as the material of the current collector or the type or capacity of the positive electrode active material) or application of the battery, or the characteristics of the additive (such as the ionic dissociation of the additive). The additive is preferably contained in an amount that enables the effect of containing the additive (and typically, the effect of improving charge/discharge cycle characteristics) to be suitably demonstrated. For example, when defining the post-endurance test capacity retention rate of a battery that uses the additive as a and defining the post-endurance test capacity retention rate of a battery in the absence of the additive as β, then the amount of the additive is set such that α-β is 5% or more and preferably 10% or more.

In the case the metal element B is present as a divalent cation (such as $Ca^{2+}$ or $Mg^{2+}$), the amount of the additive contained in the positive electrode composite is preferably about 0.5 mmol to 8 mmol, more preferably about 0.5 mmol to 5 mmol and even more preferably about 0.5 mmol to 3 mmol per 100 g of the positive electrode active material as the number of moles of the cation $B^{2+}$. In addition, in the case the metal element B is present as a monovalent cation (such as $Na^+$ or $K^+$), the amount of the additive is preferably about 1 mmol to 8 mmol and more preferably about 1 mmol to 6 mmol per 100 g of the positive electrode active material as the number of moles of the monovalent cation $B^+$.

In either case, if the amount of the additive is below the above-mentioned ranges, the effect of inhibiting corrosion of the current collector may be inadequate. In addition, if the amount of the additive exceeds the above-mentioned ranges, the capacity retention rate of the battery may decrease considerably due to increased resistance of the positive electrode composite layer, for example, even if corrosion of the current collector is inhibited.

The additive may be added at any stage during preparation of the positive electrode composite. Namely, the additive may be added by dispersing in a suitable solvent after mixing with the positive electrode active material and/or other components (such as the electrically conductive material and binder), or may be added by mixing into a dispersion after preparing a dispersion containing the positive electrode active material and other components.

An electrically conductive powdered material such as carbon powder or carbon fiber is preferably used for the electrically conductive material able to be contained in the positive electrode composite. Various types of carbon black such as acetylene black, furnace black, Ketjen black or graphite powder are preferably used for the carbon powder. One type of electrically conductive material can be used alone or two or more types can be used in combination. The amount of the electrically conductive material contained in the positive electrode composite is suitably selected corresponding to the type and amount of the positive electrode active material.

An electrically conductive material subjected to treatment for enhancing electrically conductivity carried out on the particle surfaces of the positive electrode active material may be used instead of the electrically conductive material or may be used in combination with the electrically conductive material. For example, an electrically conductive material in which a carbon film (carbon coating) has been imparted to the particle surfaces by a known method can be used preferably.

A water-soluble polymer that dissolves in water, a polymer that disperses in water or a polymer that dissolves in a non-aqueous solvent (organic solvent), for example, can be suitably selected and used for the binder (that which also functions as a thickener of the positive electrode composite). In addition, one type of binder may be used alone or two or more types may be used in combination.

Examples of water-soluble polymers include carboxymethyl cellulose (CMC), methyl cellulose (MC), cellulose acetate phthalate (CAP), hydroxypropyl methyl cellulose (HPMC), hydroxypropyl methyl cellulose phthalate (HP-MCP) and polyvinyl alcohol (PVA).

Examples of water-dispersible polymers include fluorine resins such as polytetrafluoroethylene (PTFE), tetrafluoroethylene-perfluoroalkylvinyl ether copolymer (PFA), tetrafluoroethylene-hexafluoropropylene copolymer (FEP) or ethylene-tetrafluoroethylene copolymer (ETFE), vinyl acetate copolymer and rubbers such as styrene-butadiene block copolymer (SBR), acrylic acid-modified SBR resin (SBR latex) or gum arabic.

Examples of polymers that dissolve in non-aqueous solvents (organic solvents) include polyvinylidene fluoride (PVDF), polyvinylidene chloride (PVDC), polyethylene oxide (PEO), polypropylene oxide (PPO) and polyethylene oxide-propylene oxide copolymer (PEO-PPO).

The amount of binder added is suitably selected corresponding to the type and amount of the positive electrode active material.

The negative electrode sheet 40 that composes the electrode body 20 together with the positive electrode sheet 30 can be produced by, for example, forming a negative electrode composite layer 45 by coating and drying a negative electrode composite on at least one side (and preferably both sides) of a negative electrode current collector 42.

A paste-like or slurry-like composition obtained by dispersing the negative electrode composite in a suitable solvent along with one type or two or more types of binders as necessary can be used for the negative electrode composite.

An electrically conductive member composed of a metal having favorable electrical conductivity is preferably used for the negative electrode current collector 42. For example, copper or an alloy mainly composed of copper can be used. In addition, there are no particular limitations on the shape of the negative electrode current collector 42 since the shape can be varied corresponding to the shape of the lithium ion secondary battery and the like, and can have various shapes such as that of a rod, plate, sheet, foil or mesh. A sheet-like, copper negative electrode current collector 42 is used in the present embodiment, and can be preferably used in the lithium ion secondary battery 100 provided with the wound electrode body 20.

One type or two or more types of materials conventionally used in lithium ion secondary batteries can be used for the negative electrode active material without any particular limitations thereon. An example of a preferable negative electrode active material is carbon particles. A particulate carbon material (carbon particles) containing a graphite structure (layered structure) in at least a portion thereof is used preferably. So-called graphitic carbon (graphite), non-graphitizable carbon (hard carbon), graphitizable carbon (soft carbon), and carbon materials having a structure that is a combination thereof can be used preferably. Graphite particles such as those of natural graphite can be used particularly preferably.

One type alone or a combination of two or more types of a binder similar to that used in the previously described positive electrode can be used for the binder (which can be understood to be a thickener). The amount of the binder added is suitably selected corresponding to the type and amount of the negative electrode active material.

In addition, a porous film composed of a polyolefin resin such as polyethylene or polypropylene can be preferably used for the separators 50A and 50B used by superimposing on the positive electrode sheet 30 and the negative electrode sheet 40. This film may comprise a single layer or multiple layers. The same separators or different separators may be used for the two separators 50A and 50B.

As shown in FIG. 2, the positive electrode composite layer 35 is not formed (or is removed after having been formed) on a first edge extending along the lengthwise direction of the positive electrode sheet 30 to expose the positive electrode current collector 32. The negative electrode current collector 42 is similarly exposed on a first edge of the negative electrode sheet 40. When forming a laminate by superimposing the positive and negative electrode sheets 30 and 40 with the separators 50A and 50B, the first edge of the positive electrode sheet (positive electrode current collector exposed portion) and the first edge of the negative electrode sheet (negative electrode current collector exposed portion) are symmetrically arranged about the axis of the laminate in the lengthwise direction, and the positive and negative electrode sheets 30 and 40 are superimposed while offset slightly so that both of the composite layers 35 and 45 overlap. The flat wound electrode body 20 is obtained by winding this laminate and then flattening the resulting wound body by pressing in the lateral direction.

In addition to housing the resulting wound electrode body 20 in the case 12 (FIG. 3), the exposed portion of the positive electrode current collector 32 is electrically connected to a positive electrode terminal for external connection 14, while the exposed portion of the negative electrode current collector 42 is electrically connected to a negative electrode terminal for external connection 16. At this time, portions of these terminals are arranged outside the case 12. A non-aqueous electrolyte solution is then arranged (injected) in the case 12, and the opening of the case 12 is sealed by welding the case to a lid member 13 corresponding thereto to complete assembly of the lithium ion secondary battery 100. Furthermore, sealing of the case 12 and arrangement of the electrolyte solution can be carried out in the same manner as techniques employed to produce conventional lithium ion secondary batteries.

The non-aqueous electrolyte solution can be prepared by dissolving a suitable electrolyte in an organic solvent. An electrolyte used in ordinary lithium ion secondary batteries can be used for the electrolyte without any particular limitations thereon. For example, one type or two or more types of lithium salts selected from $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$ and LiI can be used. There are no particular limitations on the concentration of electrolyte in the electrolyte solution, and for example, a concentration can be used that is the same as that of electrolyte solutions used in conventional lithium ion secondary batteries. In addition, various types of additives and the like may also be added to the electrolyte solution in addition to the electrolyte.

In addition, examples of organic solvents (non-aqueous solvents) that can be preferably used in the non-aqueous electrolyte solution include aprotic solvents such as carbonates, esters, ethers, nitriles, sulfones or lactones. One type or a combination of two or more types of organic solvents typically used in lithium ion secondary batteries can be used, examples of which include ethylene carbonate (EC), propylene carbonate (PC), diethyl carbonate (DEC), dimethyl carbonate (DMC), ethyl methyl carbonate (EMC), 1,2-dimethoxyethane (DME), 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane or γ-butyrolactone (BL).

As has been previously described, a two-phase compound, while retaining its crystal structure, is able to be present as two stable phases consisting of a phase not containing lithium ions (such as $FePO_4$) and a phase containing lithium ions (such as $LiFePO_4$). Namely, within the crystals of this two-phase compound, there is hardly any occurrence of diffusion of lithium ions between the phase containing lithium ions and the phase not containing lithium ions, and as a result of the absence of an intermediate phase in which lithium ions are diffused, the electrical potential during charging and discharging can be maintained nearly constant. Thus, the lithium ion secondary battery can function as a stable power supply even in applications such as vehicles or wind power generation in which input and output are repeated at irregular depths and rates. In addition, since the crystal structure is not damaged even if nearly all lithium ions are released, a battery can be realized that demonstrates an effective capacity (actual amount of lithium able to be used reversibly) that is roughly equal to geometric capacity. Thus, as a result of using a two-phase compound, in addition to safety, a two-phase lithium ion secondary battery can be made to be suitable for use as a vehicle power supply in view of these characteristics as well.

Figure 5:
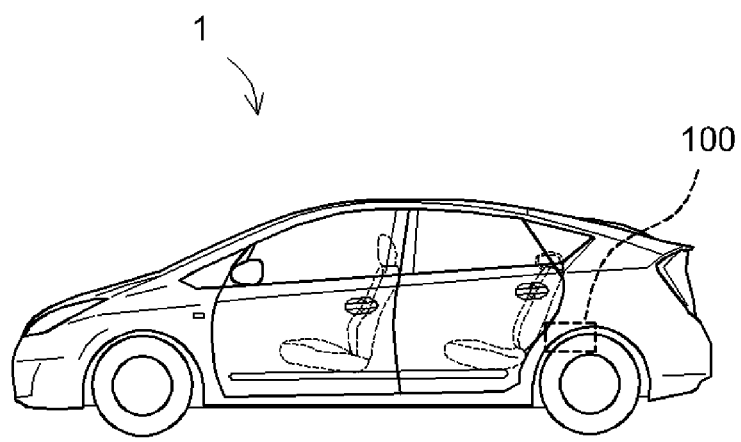
FIG. 5 is a side view schematically showing a vehicle (automobile) provided with the lithium ion secondary battery of the present invention.

In addition to the above-mentioned characteristics resulting from use of a two-phase compound for the positive electrode active material, since the two-phase lithium ion secondary battery disclosed herein also has superior endurance enabling it to accommodate harsh charge/discharge cycling as previously described, it can be preferably used as, for example, a power supply for a motor installed in a vehicle such as an automobile. This secondary battery may also be used in the form of an assembled battery obtained by connecting a plurality of the batteries in series and/or in parallel. Thus, as schematically shown in FIG. 5, the present invention provides a vehicle (typically, an automobile, and particularly an automobile provided with a motor in the manner of a hybrid vehicle, electric vehicle or fuel cell vehicle) 1 provided with this lithium ion secondary battery (which may also be in the form of an assembled battery) 100 for the power supply thereof Furthermore, although it is not necessary in terms of carrying out the present invention to clarify the phenomenon by which corrosion of the current collector occurs in a two-phase lithium ion battery when conducting endurance testing for use with vehicles, or the mechanism by which this corrosion of the current collector is inhibited in the case of using a positive electrode having the configuration disclosed herein, possible explanations for these are described below.

In a two-phase lithium ion secondary battery, when lithium ions having a positive charge are inserted into the negative electrode during charging, a transition metal in the positive electrode active material (such as $Fe^{II}$ in $LiFePo_4$) normally compensates for that charge. Namely, electrons released accompanying oxidation of the transition metal (such as oxidation from $Fe^{II}$ to $Fe^{III}$) are sent to the negative electrode via an external circuit. However, in endurance testing for use in a vehicle, when an overcharge region occurs at the positive electrode, the constituent metal element A of the current collector compensates for the charge in that region instead of the transition metal (as a result of, for example, Al being oxidized to $Al^{3+}$ resulting in the release of three electrons), thereby creating the possibility of corrosion of the current collector. Here, when a compound containing in the composition thereof the metal element B having a higher ionization tendency than the metal element A is used together with a two-phase compound serving as the positive electrode active material, the metal element B becomes directly or indirectly involved in the above-mentioned charge compensation (namely, is responsible for compensating for the charge instead of the transition metal or promoting an oxidation reaction of the transition metal (such as oxidation from $Fe^{II}$ to $Fe^{III}$)), thereby inhibiting corrosion of the current collector in that region.

Although the following provides an explanation of several examples relating to the present invention, this explanation is not intended to limit the present invention to these specific examples.

EXAMPLE 1

$LiFePO_4$ was synthesized by hydrothermal synthesis in accordance with that described in a known document (Kaoru Dokko, et al., Journal of Power Sources, Vol. 165, pp. 656-659, 2007). The resulting $LiFePO_4$ was prepared in the form of particles having a mean particle diameter of 0.7 µm using a ball mill.

Next, a carbon coating was applied to the surface of the resulting particulate $LiFePO_4$ in accordance with the method described in Japanese Patent Application Laid-open No. 2008-311067. Namely, an $LiFePO_4$-polyvinyl alcohol aggregate having a mean particle diameter of 20 µm was obtained using a rotating fluid layer method from a slurry-like composition obtained by adding 5 parts by weight of polyvinyl alcohol to 100 parts by weight of $LiFePO_4$ and dispersing in water. This was then fired for 1.5 hours at 800° C. in a hydrogen atmosphere to reduce the polyvinyl alcohol and obtain carbon-coated $LiFePO_4$ by carbonization.

PVDF was added to the resulting carbon-coated $LiFePO_4$ so that the weight ratio of the $LiFePO_4$, carbon coating and binder (PVDF) was 88:2:10, and the mixture was uniformly crushed and kneaded with a bead mill using NMP for the dispersion medium to obtain a slurry-like positive electrode composite having a solid fraction (NV) of 40% by weight. Powdered calcium fluoride (additive), equivalent to 50 mg as the weight of $Ca^{2+}$ (namely, 50 ppm, 1.25 mmol or 0.36 mmol per 100 g of the positive electrode active material ($LiFePO_4$)), was then added to 1 kg of this positive electrode composite (352 g as the weight of the positive electrode active material ($LiFePO_4$)) as additive followed by mixing well.

The positive electrode composite was then coated onto both sides of aluminum foil (positive electrode current collector) having a thickness of about 15 µm and measuring 10.0 cm×100 cm so that the coated amount (based on NV) was about 30 mg/m² as the total for both sides. After drying, the coated aluminum foil was pressed to a total thickness of about 150 µm to obtain a positive electrode sheet.

Alligator clips were attached to both ends of the positive electrode sheet, and current and voltage were applied followed by measurement of positive electrode initial resistance (mΩ) using the standard four probe method.

Natural graphite powder, SBR and CMC were mixed with ion exchange water so that the weight ratio of these materials was 95:2.5:2.5 and the NV value was 45% by weight to prepare a slurry-like composition for use as the negative electrode composite. This negative electrode composite was coated onto both sides of copper foil (negative electrode current collector) having a thickness of about 12 µm and measuring 10.5 cm×100 cm. After drying, the coated copper foil was pressed to a total thickness of 100 µm to obtain a negative electrode sheet. Furthermore, the coated amount of the negative electrode composite (based on NV) was adjusted so that the ratio of the geometrical capacity of the positive electrode to the geometric capacity of the negative electrode was 2:3.

The resulting positive electrode sheet and negative electrode sheet were wound by superimposing with two polypropylene/polyethylene composite porous sheets having a thickness of 20 µm. The resulting wound body was housed with an electrolyte solution in a rectangular container having an inner volume of 100 mL and employing a structure that enabled access to a positive electrode terminal and a negative electrode terminal, and the container was sealed to obtain a battery according to Example 1. An electrolyte solution obtained by dissolving $LiPF_6$ in a solvent obtained by mixing EC, DMC and EMC at a volume ratio of 1:1:1 to a concentration of 1 mol/L was used for the electrolyte solution.

This battery was then subjected to initial charging treatment consisting of constant-current charging at a rate of 1/5 C, followed by repeating a procedure consisting of charging to 4.1 V at a rate of 1/3 C and a procedure of discharging to 3.0 V at a rate of 1/3 C for three cycles to obtain a battery according to Example 1. Furthermore, 1 C refers to the amount of current that enables battery capacity (Ah) as predicted from the geometric capacity of the positive electrode be charged in 1 hour.

EXAMPLE 2

A battery according to Example 2 was obtained in the same manner as Example 1 with the exception of adding calcium phosphate ($Ca_3(PO_4)_2$) equivalent to 100 mg as the weight of $Ca^{2+}$ (2.5 mmol, 0.71 mmol per 100 g of the positive electrode active material) as additive to 1 kg of the positive electrode composite.

EXAMPLE 3

A battery according to Example 3 was obtained in the same manner as Example 1 with the exception of adding $CaF_2$ equivalent to 500 mg as the weight of $Ca^{2+}$ (12.5 mmol, 3.6 mmol per 100 g of the positive electrode active material) as additive to 1 kg of the positive electrode composite.

EXAMPLE 4

A battery according to Example 4 was obtained in the same manner as Example 1 with the exception of adding $Ca_3(PO_4)_2$ equivalent to 1000 mg as the weight of $Ca^{2+}$ (25 mmol, 7.1 mmol per 100 g of the positive electrode active material) as additive to 1 kg of the positive electrode composite.

EXAMPLE 5

A battery according to Example 5 was obtained in the same manner as Example 1 with the exception of adding $CaF_2$ equivalent to 2000 mg as the weight of $Ca^{2+}$ (50 mmol, 14 mmol per 100 g of the positive electrode active material) as additive to 1 kg of the positive electrode composite.

EXAMPLE 6

A battery according to Example 6 was obtained in the same manner as Example 1 with the exception of adding $Ca_3(PO_4)_2$ equivalent to 2500 mg as the weight of $Ca^{2+}$ (62.4 mmol, 18 mmol per 100 g of the positive electrode active material) as additive to 1 kg of the positive electrode composite.

EXAMPLE 7

A battery according to Example 7 was obtained in the same manner as Example 1 with the exception of adding $Na_3PO_4$ equivalent to 100 mg as the weight of $Na^+$ (4.35 mmol, 1.2 mmol per 100 g of the positive electrode active material) as additive to 1 kg of the positive electrode composite.

EXAMPLE 8

A battery according to Example 8 was obtained in the same manner as Example 1 with the exception of adding $Na_3PO_4$ equivalent to 500 mg as the weight of $Na^+$ (21.7 mmol, 6.2 mmol per 100 g of the positive electrode active material) as additive to 1 kg of the positive electrode composite.

EXAMPLE 9

A battery according to Example 9 was obtained in the same manner as Example 1 with the exception of adding $K_3PO_4$ equivalent to 500 mg as the weight of $K^+$ (12.8 mmol, 3.6 mmol per 100 g of the positive electrode active material) as additive to 1 kg of the positive electrode composite.

EXAMPLE 10

A battery according to Example 10 was obtained in the same manner as Example 1 with the exception of adding $K_3PO_4$ equivalent to 2000 mg as the weight of $K^+$ (51.2 mmol, 15 mmol per 100 g of the positive electrode active material) as additive to 1 kg of the positive electrode composite.

EXAMPLE 11

A battery according to Example 11 was obtained in the same manner as Example 1 with the exception of not using an additive.

EXAMPLE 12

A battery according to Example 12 was obtained in the same manner as Example 1 with the exception of adding nickel oxalate ($NiC_2O_4$) equivalent to 500 mg as the weight of Ni (8.5 mmol, mmol per 100 g of the positive electrode active material) as additive to 1 kg of the positive electrode composite.

EXAMPLE 13

A battery according to Example 13 was obtained in the same manner as Example 1 with the exception of adding niobium oxide ($Nb_2O_5$) equivalent to 500 mg as the weight of Nb (5.4 mmol, mmol per 100 g of the positive electrode active material) as additive to 1 kg of the positive electrode composite.

EXAMPLE 14

A battery according to Example 14 was obtained in the same manner as Example 1 with the exception of adding molybdenum disulfide ($MoS_2$) equivalent to 500 mg as the weight of Mo (5.2 mmol, mmol per 100 g of the positive electrode active material) as additive to 1 kg of the positive electrode composite.

[Endurance Test]

Each battery was subjected to 1000 cycles of a charge/discharge cycle at 60° C. comprising a procedure consisting of charging at 2 C until the inter-terminal voltage reached 4.1 V and a procedure consisting of discharging at 2 C until the voltage decreased from 4.1 V to 2.5 V.

[Capacity Retention Rate]

After adjusting each battery to an SOC (state of charge) of 100%, the battery was discharged at 25° C. at a rate of 0.2 C until SOC reached 0% followed by measurement of discharge capacity at this time both before and after the above-mentioned endurance test. Capacity retention rate (%) was determined as a percentage of discharge capacity before the endurance test to discharge capacity after the endurance test.

[Rate of Increase in Positive Electrode Resistance]

Each of the batteries that were measured for capacity retention rate following the endurance test were disassembled in an argon atmosphere, the removed positive electrode sheet was adequately cleaned with EMC and then vacuum-dried overnight at room temperature followed by removal of the EMC. The resistance (mΩ) of the positive electrode sheet following the endurance test was then measured using the standard four probe method in the same manner as the previously described measurement of positive electrode initial resistance. The rate of increase (%) in positive electrode resistance was then determined as a percentage of the resistance value of the positive electrode after the endurance test to the initial resistance value.

[Current Collector Corrosion]

Figure 4:
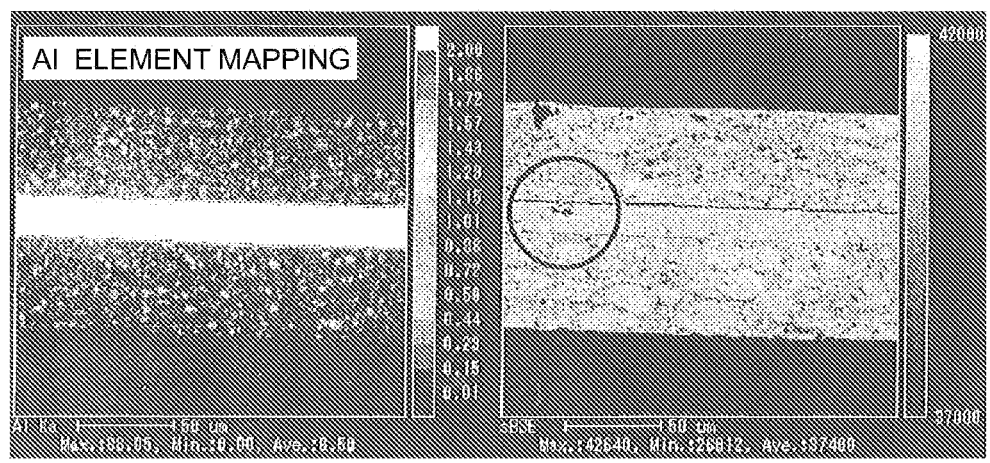
FIG. 4 is a BSE image showing corrosion of a positive electrode current collector in one embodiment.

After measuring the rate of increase in positive electrode resistance, each positive electrode sheet was cut and the presence or absence of corrosion was confirmed from BSE (back-scattered electron) images of the exposed cross-section. A BSE image showing a cross-section of the positive electrode sheet according to Example 11 is shown in FIG. 4 (corrosion can be seen in the encircled area).

The results for the batteries of Examples 1 to 14 are shown in Table 1 together with the type and added amount of the metal element B (as the weight of the metal element B) contained in the additive used in each battery.

TABLE 1

| Example | Metal element B | Added amt. (ppm) | Capacity retention rate (%) | Resistance rate of increase (%) | Current collector corrosion? |
|---------|-----------------|------------------|------------------------------|----------------------------------|------------------------------|
| 1 | Ca | 50 | 82 | 103 | Yes |
| 2 | Ca | 100 | 94 | 100 | No |
| 3 | Ca | 500 | 93 | 101 | No |
| 4 | Ca | 1000 | 90 | 101 | No |
| 5 | Ca | 2000 | 15 | 101 | No |
| 6 | Ca | 2500 | 8 | 102 | No |
| 7 | Na | 100 | 92 | 101 | No |
| 8 | Na | 500 | 89 | 101 | No |
| 9 | K | 500 | 91 | 101 | No |
| 10 | K | 2000 | 27 | 101 | No |
| 11 | — | — | 77 | 104 | Yes |
| 12 | Ni | 500 | 76 | 105 | Yes |

TABLE 1-continued

| Example | Metal element B | Added amt. (ppm) | Capacity retention rate (%) | Resistance rate of increase (%) | Current collector corrosion? |
|---|---|---|---|---|---|
| 13 | Nb | 500 | 78 | 104 | Yes |
| 14 | Mo | 500 | 82 | 104 | Yes |

As is shown in Table 1, the batteries of Examples 1 to 10, which were obtained by using an additive containing a metal element B (here, Ca, Na or K) having a higher ionization tendency than the metal element A serving as the main constituent of the current collector (here, Al), each demonstrated lower rates of increase in positive electrode resistance in comparison with the battery of Example 11 in which an additive was not used. In the batteries of Examples 2 to 10 having larger added amounts of the metal element B, the effect of lowering the rate of increase in positive electrode resistance was observed to be greater than that of the battery of Example 1 having a smaller added amount. In the batteries of Examples 2 to 4 and 7 to 9 in particular, the capacity retention rates after the endurance test were roughly 90% or higher (and more specifically, 89% to 94%). On the other hand, in the battery of Example 11 that did not contain an additive and the batteries of Examples 12 to 14 that were obtained by using an additive containing a metal element B (here, Ni, Nb and Mo) having a lower ionization tendency than the metal element A, the rate of increase in positive electrode resistance after the endurance test were equal to or greater than that of Example 11, and the effect of the additive of lowering the rate of increase in resistance was not observed. Moreover, corrosion of the current collector was also observed, and capacity retention rates after the endurance test were 82% or lower for each of these batteries.

Although the above has provided a detailed explanation of specific examples of the present invention, these examples are merely intended to be exemplary and are not intended to limit the claims. Various variations and modifications of the above-mentioned specific examples are included in the technology described in the claims.

Reference Signs List
1 Vehicle (automobile)
20 Wound electrode body
30 Positive electrode sheet (positive electrode)
32 Positive electrode current collector
35 Positive electrode composite layer
40 Negative electrode sheet (negative electrode)
42 Negative electrode current collector
45 Negative electrode composite layer
50A, 50B Separator
100 Lithium ion secondary battery

The invention claimed is:

1. A lithium ion secondary battery, comprising a positive electrode having a current collector and a positive electrode composite layer provided on the current collector, wherein the secondary battery satisfies each of the following conditions:
   the collector contains a metal element A as a main component thereof;
   the positive electrode composite layer contains a two-phase compound containing lithium as a positive electrode active material, wherein the two-phase compound is an olivine compound represented by the general formula: $Li_xFe_{1-y}M_yZO_4$ where, M represents at least one type of element selected from the group consisting of Mn, Mg, Ni, Co, Cu, Zn, Ge, Cr, V, Nb, Mo, Ti and Ga, Z represents P or Si, x satisfies the relationship of $0.05 \leq x \leq 1.2$, and y satisfies the relationship of $0 \leq y \leq 0.5$;
   the positive electrode composite layer further contains as an additive a fluoride or phosphate salt having a metal element B having a higher ionization tendency than the metal element A in the form of a divalent or monovalent cation, wherein the metal element B is at least one selected from the group consisting of Ca, Na, K, Be, Mg, Sr, Ba, Rb and Cs; and
   an amount of the salt contained in the positive electrode composite layer is 0.5 mmol to 8 mmol as the number of moles of the cation $B^{2+}$ in the case the cation is divalent, or 1 mmol to 8 mmol as the number of moles of the cation $B^+$ in the case the cation is monovalent, per 100 g of the positive electrode active material.

2. The lithium ion secondary battery according to claim 1, wherein the additive is a fluoride salt of the metal element B.

3. The lithium ion secondary battery according to claim 1, wherein the additive is a phosphate salt of Na or K.

4. The lithium ion secondary battery according to claim 1 for use in a vehicle.

* * * * *